Patented Oct. 6, 1931

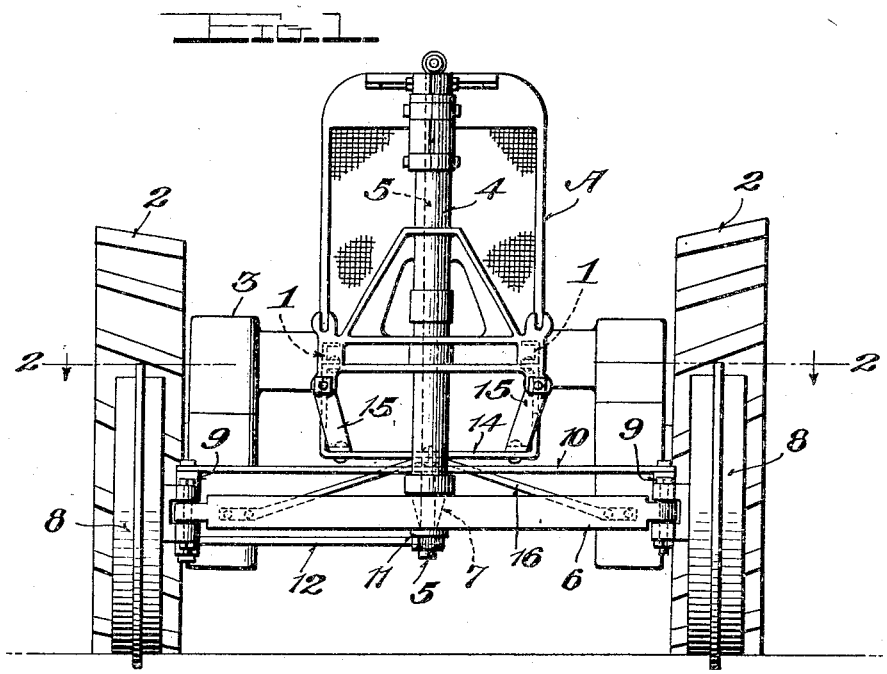
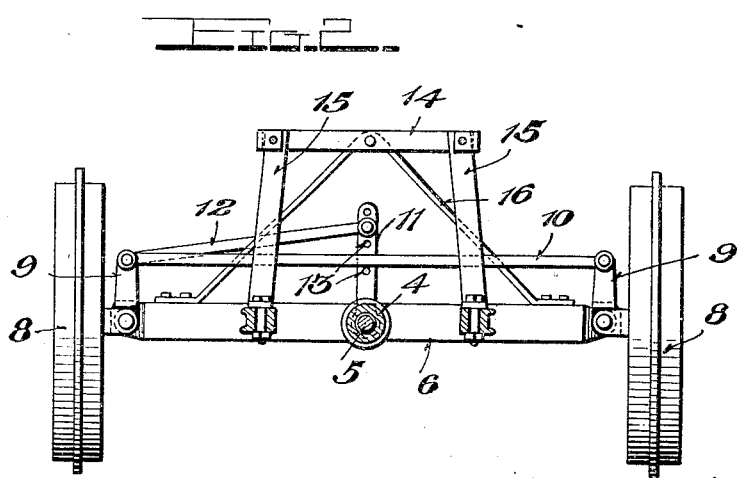

1,826,238

UNITED STATES PATENT OFFICE

HENRY BUSE, OF PARKER, SOUTH DAKOTA

TRACTOR ATTACHMENT

Application filed October 29, 1929. Serial No. 403,308.

This invention relates to improvements in steering attachments for tractors or the like and pertains more particularly to tractors used in plowing or cultivating ground.

An important object of this invention is to provide a steering attachment for farm tractors in which the front wheels of the tractor are alined with the rear wheels thereof.

A further object of this invention is to provide a steering attachment for tractors in which each of the front wheels is provided with a circumferential flange which latter is substantially alined with the center of the rear wheels of the tractor whereby the use of a furrow guide is eliminated.

A still further object of the invention is to provide a steering attachment for tractors in which the front wheels are provided with a furrow guide means and in which the front wheels track with the rear wheels so that manual steering of the tractor is unnecessary in straight line plowing or cultivating.

Heretofore it has been customary to employ steering mechanism for the usual type of farm tractors, comprising a centrally disposed steering column mounted on the front of the frame of the tractor forward of the radiator, the lower end of the steering column being supported upon a short axle having a flanged wheel at each end thereof. However, these wheels were disposed intermediate the line of travel of the rear wheels of the tractor and necessitated manual steering of the tractor or the employment of a furrow guide for holding the tractor in line in plowing.

The use of the present device eliminates manual steering in straight line plowing due to the fact that the front wheels track with the rear wheels and act as a furrow guide.

The foregoing and other objects will be apparent throughout the course of the following description and drawings, in which:

Fig. 1 is a front elevation of the tractor with the improved steering mechanism mounted thereon; and Fig. 2 is a plan view partly in section of the steering mechanism taken on line 2—2 of Fig. 1.

Referring in detail to the drawings, A designates generally a tractor comprising a frame 1 supported at its rear end upon traction wheels 2 through the usual drive mechanism 3. Mounted upon the forward end of the frame is a vertically disposed steering column 4 formed to receive a shaft 5 shown in dotted lines in Fig. 1, all of which construction is at present in general use.

The present invention comprises an axle 6 adapted to support the lower end of the steering column 4 and is provided with a tapered opening 7 formed to receive the lower end of the shaft 5. Mounted upon each end of the axle is a pivoted wheel 8 of the stub axle type having rearwardly extending arms 9 connected at their free ends by drag link 10. A rearwardly extending link 11 has one end rigidly secured to the shaft 5 beneath the axle 6 and is connected to one of the rearwardly extending arms 9 through the medium of a rod 12. The rearwardly extending member 11 is provided with a series of spaced openings 13 for permitting adjustment of rod 12 to regulate the throw or movement of the steering mechanism.

To brace the axle 6 against rearward movement, a U-shaped band 14 is provided having its ends secured to opposite sides of the tractor frame rearwardly of the steering column and is in turn prevented from rearward movement by means of spaced brace rods 15 having one of their ends secured to the bight of the U-shaped member and their opposite ends secured to the forward portion of the frame upon each side of the latter. A V-shaped brace member 16 is pivotally secured to the U-shaped brace 14 at its apex and has its ends extending divergently outward toward and secured to opposite ends of the axle 6 adjacent the stub axles.

The tapered opening 7 in the axle permits oscillatory movement of the axle about the shaft 5 when the tractor is operating on uneven ground.

The wheels 8 are each provided with a centrally disposed peripheral flange substantially alined with the center of the rear traction wheels 2 and are formed to track with the latter, in straight line plowing or cultivating while at the same time eliminating the use of the furrow guide necessary at present.

In the operation of the present invention the short axle and wheels at present in use and which are disposed intermediate the line of travel of the rear wheels, are removed and the mechanism disclosed in the drawings substituted therefor. It will be noted that in plowing, when the first furrow has been formed it is only necessary to dispose one of the front wheels in the preformed furrow whereupon the same acts as a furrow guide in forming successive furrows. Further, it will be obvious that manual steering of the tractor and the use of the usual furrow guide is unnecessary due to the fact that the front wheels are substantially alined and track with the rear wheels.

Having thus described my invention, what I claim is:—

1. A steering attachment for tractors including a centrally disposed steering column supported upon the front of the tractor, a shaft mounted within said steering column and having a portion extending below the lower end of said column, a wheeled axle of substantially the same width as the rear wheels of the tractor, said wheeled axle being provided with an opening formed to receive the lower end of said shaft, a U-shaped member disposed rearwardly of the steering column and having its ends connected to the sides of the tractor frame, V-shaped bracing means connected at its apex to the bight of the U-shaped member having its free ends connected to the axle.

2. A steering attachment for tractors having a steering column mounted upon the front end of the frame thereof, comprising a wheel carrying axle disposed beneath and supporting said steering column, said axle having a tapered opening intermediate its ends, a shaft in said column having its lower end received in said opening, means connecting the lower end of the shaft and the front wheels of the tractor for actuating the latter, a U-shaped member disposed rearwardly of the column and having its ends connected to the sides of the frame, inclined brace rods having one of their ends connected to the forward end of the tractor and having their opposite ends connected to said U-shaped member, and a V-shaped radius rod pivotally secured at its apex to the U-shaped member and having its free ends connected to said axle.

3. A steering mechanism for tractors having a steering column carried at its forward end, a wheeled axle disposed beneath and supporting said steering column, means interposed between the column and axle for actuating the latter, a U-shaped band disposed rearwardly of the column and having its ends connected to the sides of the tractor, inclined spaced brace rods connecting the band and forward end of the tractor upon each side of the column and a V-shaped radius rod pivotally connected at its apex to the U-shaped member intermediate the brace rods, the ends of said radius rods diverging outwardly and connected to the axle adjacent the wheels.

In testimony whereof I affix my signature.

HENRY BUSE.